Dec. 13, 1932.  C. P. HINMAN  1,890,648
EXACT WEIGHT RECORDER
Filed March 11, 1930   3 Sheets-Sheet 1
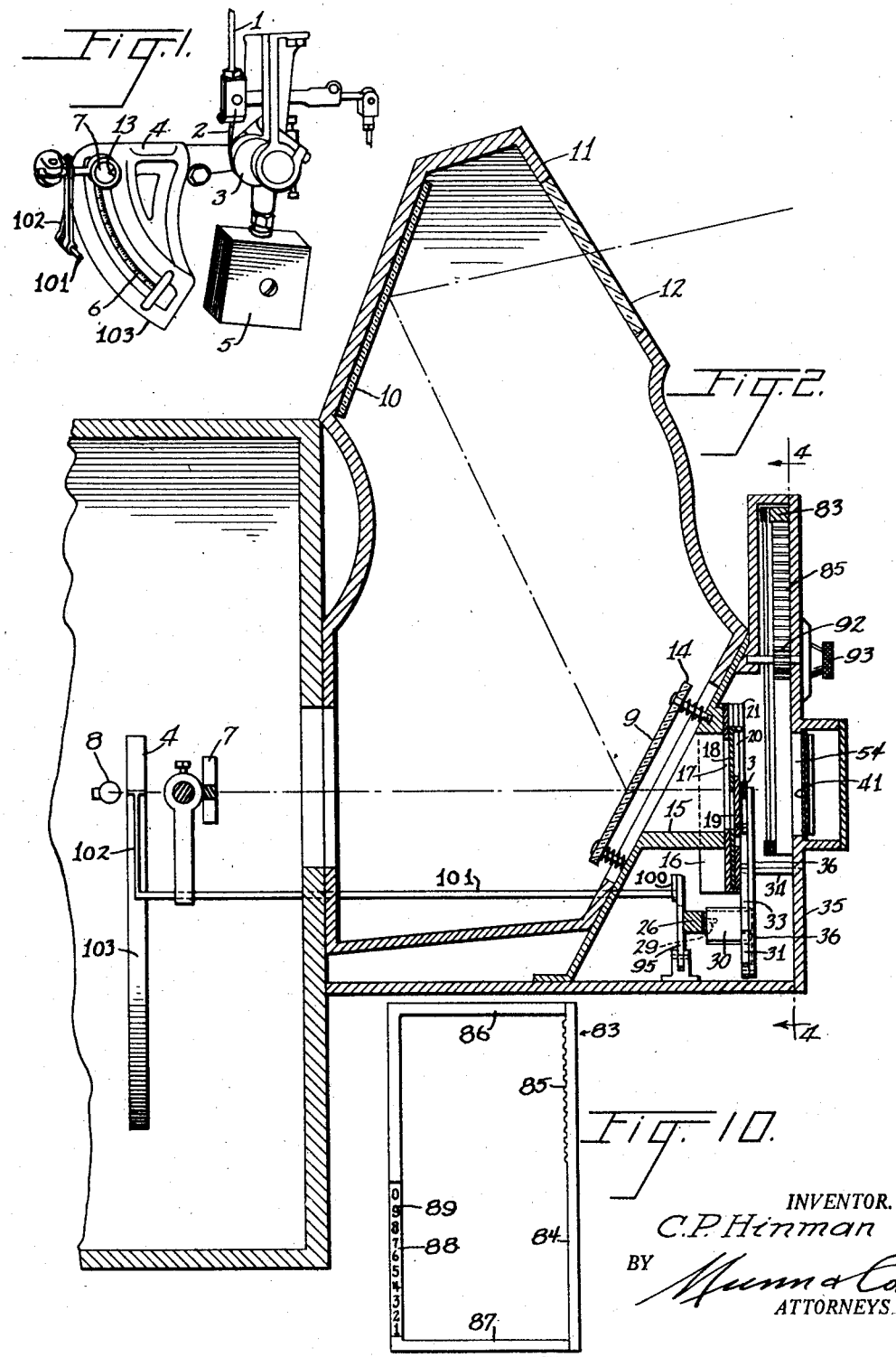
INVENTOR.
C. P. Hinman
BY
Munn & Co.
ATTORNEYS.

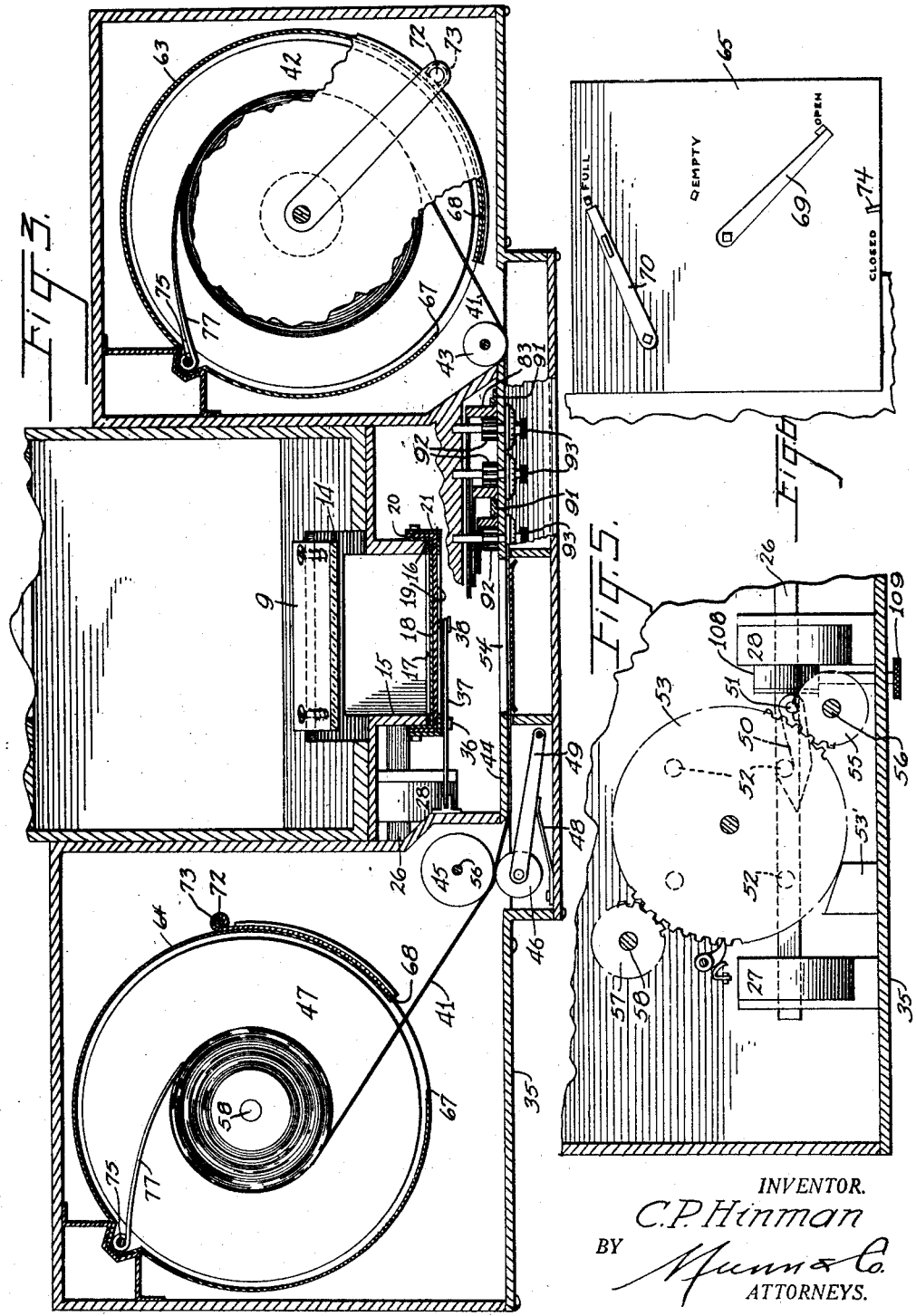

Dec. 13, 1932.  C. P. HINMAN  1,890,648
EXACT WEIGHT RECORDER
Filed March 11, 1930  3 Sheets-Sheet 3
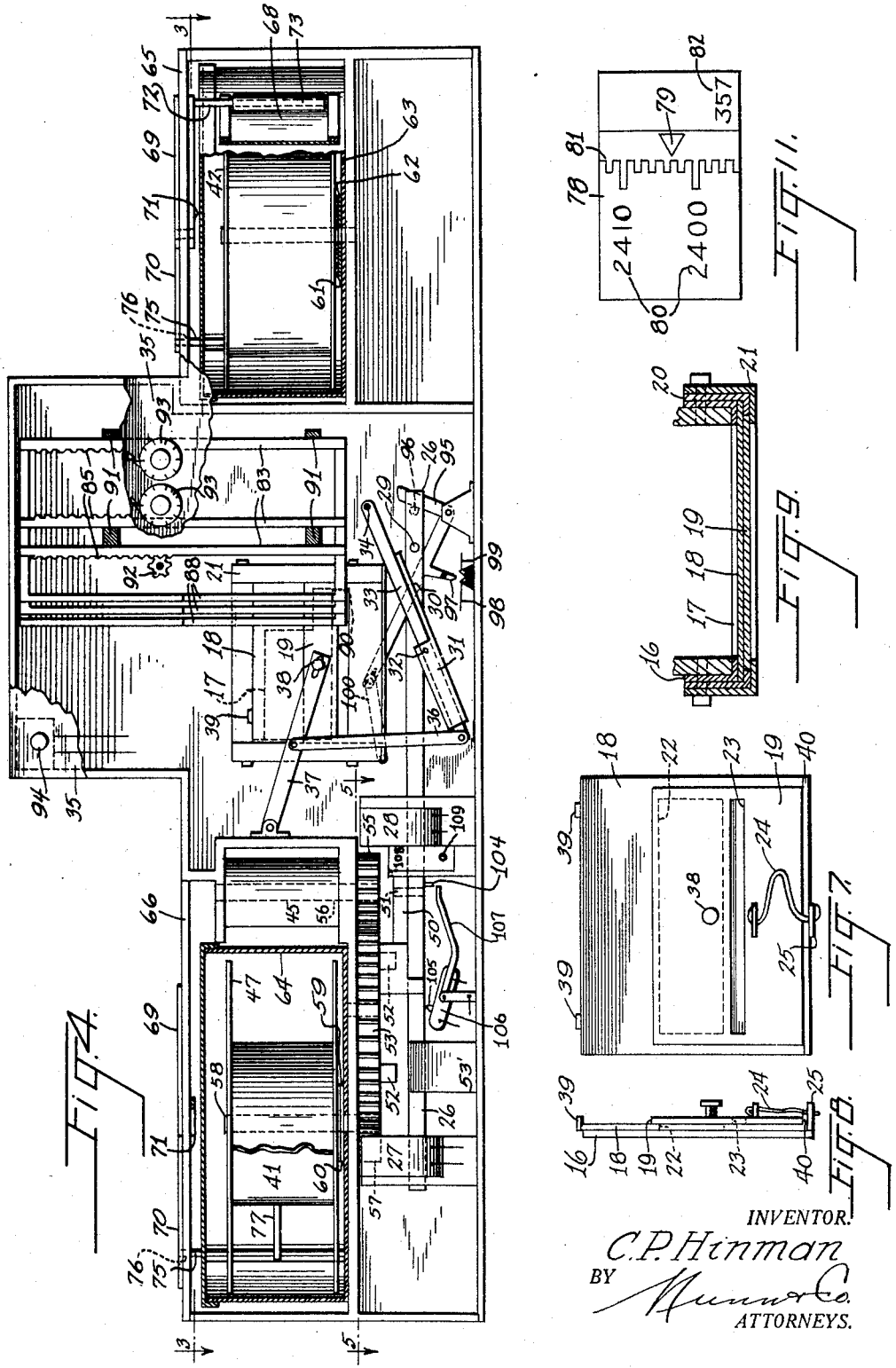
INVENTOR.
C. P. Hinman
BY
ATTORNEYS.

Patented Dec. 13, 1932

1,890,648

UNITED STATES PATENT OFFICE

CHARLES P. HINMAN, OF HONOLULU, TERRITORY OF HAWAII

EXACT WEIGHT RECORDER

Application filed March 11, 1930. Serial No. 434,879.

My invention relates to improvements in exact weight recorders, and it consists in the combinations, constructions and arrangements hereinafter described and claimed.

An object of my invention is to provide an exact weight recorder which may be used in connection with a weighing scale, and which will record the exact weight of articles placed upon the scale.

A further object of my invention is to provide a device of the type described in which predetermined characters can be positioned so as to be reproduced on the ticket and thus be associated with the weight recorded on the ticket. In this way a permanent record may be kept of the weight of the article, and the ticket will not only have the weight designated but will also have the number of the article.

Other objects and advantages will appear as the specification proceeds, and the novel features of the device will be particularly pointed out in the claims hereto annexed.

My invention is illustrated in the accompanying drawings, in which:

Figure 1 is a perspective view of a mechanism associated with a weighing scale for giving the exact weight, Figure 2 is a vertical section through my device, and shows how it is operatively connected with the mechanism shown in Figure 1, Figure 3 is a section along the line 3—3 of Figure 4, Figure 4 is a section along the line 4—4 of Figure 2, Figure 5 is a section along the line 5—5 of Figure 4, Figure 6 is a top plan view of one of the covers, Figure 7 is a front elevation of a shutter mechanism, Figure 8 is a side elevation of Figure 7, Figure 9 is a horizontal section through Figure 7, Figure 10 is a plan view of one of the character carrying members, and Figure 11 shows the type of ticket vended by the machine.

In carrying out my invention I make use of an exact weight mechanism of the character shown in Figure 1, in which a rod 1 is actuated by the weight placed upon the scale and unwinds a tape 2 from an eccentric 3 so as to cause the eccentric to swing about its axis. The eccentric carries an arm 4 and a weight 5. The arm 4 carries a transparent scale 6 indicating various weights.

When the weighing scale (not shown) is actuated, the rod 1 is raised, and this will swing the arm 4 for causing the transparent strip 6 to pass between a magnifying glass 7 (see Figures 1 and 2) and a source of light 8. The weight 5 will counterbalance the force exerted upon the rod 1 in lifting it, and the scale strip 6 will come to rest and will indicate the exact weight of the article placed on the weighing scales.

The source of light 8 will throw the image from the scale 6 upon a reflecting surface 9 (see Figure 2), and this reflecting surface in turn will throw the image upon a mirror 10 disposed at the top of a casing 11. The mirror 10 throws the image through a glazed glass 12 where it may be viewed by the operator. A pointer 13 (see Figure 1) may be associated with the magnifying glass 7 for indicating the exact weight on the image thrown from the strip 6 or the precision chart negative.

My invention contemplates the use of a portion of the light rays in recording the exact weight on a ticket. It will be noted from Figure 2 that the reflecting surface 9 is formed on a transparent member 14 that will permit part of the light rays to pass through a tubular member 15 and to strike against a shutter mechanism now to be described.

Reference to Figures 7, 8 and 9 shows the shutter mechanism as comprising a cover member 16 having an opening 17, and this opening is of the shape shown by the dotted lines in Figure 4 for a purpose hereinafter described. In front of the opening 17 I mount one member 18 of a compound shutter. Directly in front of the member 18 I mount another member 19. A guide member 20 (see Figure 9) is spaced from the member 16, and these two members act as a guide for the vertical movement of the member 18. A retaining member 21 acts as a guide for the member 19.

In Figure 2, 7 and 8 I show the shutter 18 as having an opening 22 substantially one-half the height of the opening 17. The shutter 19 has an opening 23 which is in the form of a narrow slit having a length equal to the length of the opening 22. A spring 24 connected to the shutter 19 and to a lug 25 carried by the member 16 normally keeps the shutters 18 and 19 in their lowermost and closed positions. When the shutters are in this position, the opening 22 registers with the opening 17, but the opening 23 is disposed below the opening 22.

It is best now to describe the means for actuating the shutters. In Figure 4 I show a rod 26 that is slidably mounted in solenoids 27 and 28. Means hereinafter described first energizes the solenoid 27, which will cause the rod 26 to move to the left in Figure 4. The rod carries a pin 29 that slidably engages with a portion 30 of a member 31 that is pivoted at 32 to an arm 33. The arm 33 in turn is pivoted at 34 to the front wall 35 of the device. The movement of the pin 29 to the left will cause the portion 30 to contact with the arm 33 and to lift the arm, the arm in turn raising a link 36 that is pivotally secured to the outer end of the arm.

The link 36 is pivoted to an arm 37 (see Figure 4), and the free end of the arm is connected to the shutter 19 at 38. The upward movement of the arm 37 will first cause the slot 23 to register with the opening 22 and to move across this opening. When the opening 23 reaches the top of the opening 22 and before it passes out of registration, the shutter 19 engages with lugs 39 (see Figures 7 and 8), and further upward movement of the shutter 19 will likewise raise the shutter 18. This movement continues until the opening 22 has reached the top of the opening 17.

At this time the pin 29 has moved throughout the entire length of the portion 30 (see Figures 2 and 4), and further movement of the rod 26 to the left will cause the pin 29 to free the portion 30, and this will permit the arm 33 to return to starting position quickly. The return movement of the arm 33 will also cause the arm 37 to return to its normal position. This will bring the shutters 18 and 19 back into normal position. The spring 24 moves the shutter 19 with respect to the shutter 18 until the shutter 19 rests upon a flange 40 carried by the lower edge of the shutter 18. The shutters 18 and 19 in their lowermost positions rest upon the lug 25.

I have shown how the shutters 18 and 19 are gradually opened, and how they are quickly returned to normal position. The strength of the solenoid 27 will determine the amount of time required in opening the shutters. The shutters in opening will permit the light rays that have passed through the glass 14 to pass on to a sensitized strip of material 41 (see Figure 2). The strip may be a film or it may be any other suitable substance such as photostat paper. The image projected from the precision chart negative 6 will be photostated on the strip 41.

It is best now to describe how the strip 41 is fed from one spool and wound upon another, and how it is moved step by step for each actuation of the machine. In Figure 3 it will be noted that I provide a feed spool 42 which carries a roll of the strip 41. The strip 41 is passed over an idler 43 and then along the front face of a member 44. From here the strip passes between a driving pulley 45 and an idler 46. The free end of the strip is secured to a take-up spool 47. Figure 3 shows how the idler 46 is yieldingly held against the driving pulley 45 by means of a spring 48, this spring bearing against an arm 49 which carries the idler 46.

Referring back to the shutter-actuating mechanism it will be seen from Figure 5 that the square rod 26 carries a pawl 50 that pivots at 51 in a horizontal plane. Figure 4 shows the pawl 50 as being mounted on top of the rod 26, while Figure 5 shows the pawl engaging with one of four pins 52 carried by the under-surface of a large gear 53.

During the left-hand movement of the rod 26, the pawl 50 will free the lower right-hand pin 52 in Figure 5 and will be moved toward the lower left-hand pin 52.

A cam member 53′ causes the pawl 50 to engage with the lower left-hand pin 52 before the rod 26 starts moving toward the right. While the pawl 50 is moving from one pin to the other, the shutters 18 and 19 are being actuated for causing that portion of the strip 41 disposed in front of an opening 54 in the member 44 to take a picture. The shutters move into closed position prior to the pawl 50 engaging with the next pin 52. The movement of the rod 26 to the right will cause the pawl 50 to rotate the gear 53 counter-clockwise through one-fourth of a revolution. The gear 53 meshes with a gear 55 and will turn this gear one complete revolution in a clockwise direction. The gear 55 is mounted upon a shaft 56 which carries the driving pulley 45. It will therefore be seen that the pulley 45 will move the strip 41 a distance equal to the length of the opening 54.

It will also be noted from Figure 5 that the gear 53 drives a gear 57 of the same size as the gear 55. The gear 57 is mounted upon a shaft 58 which in turn carries the spool 47. It will further be noted from Figure 4 that a disc 59 is carried by the shaft 58 and is rotated thereby. The disc 59 frictionally engages with a disc 60 that is secured to the under-surface of the take-up spool 47. The tendency of the disc 59 is to rotate the spool 47 one complete revolution. It is obvious that as the strip 41 is wound on the spool 47, the spool need turn through a gradually diminishing arc. This is taken care of by the slippage between the discs 59 and 60.

The feed spool 42 has a disc 61 similar to the disc 60 (see Figure 4). A disc 62 frictionally engages with the disc 61, and is secured to the bottom of a spool container 63. By this means sufficient drag is placed upon the spool 42 to prevent the spool from unwinding a greater quantity of the strip 41 than is absolutely required.

I will now describe how the spools 42 and 47 are placed in position. Since the spools carry sensitive paper, it is necessary to keep them in light-proof containers. I have already set forth that the spool 42 is placed within a container 63. In like manner the spool 47 is placed within a container 64. The containers 63 and 64 are removable from the machine through covers 65 and 66. The new spool 42 is placed within the container 63 while the operator is in a dark room, and subsequently the container is placed in the machine.

In Figure 3 I show both containers as being provided with openings 67 in their sides. Sliding doors 68 (see Figure 4) normally close the openings 67. While the operator is in the dark room, a sufficient length of sensitive paper is passed through the opening 67 in the container 63 for permitting this strip to be passed over the idler and drive spools 43 and 45 and then to be secured to the spool 47. The front cover 35 is removed from the machine during this operation.

The top covers 65 and 66 are now disposed in place and may be locked down by any means (not shown). Figure 6 shows the top cover 65 as being provided with two arms 69 and 70. These same two arms are also provided for the cover 66. In Figure 4 I show the arm 69 as being connected to an arm 71 disposed on the under-side of the cover 65. The arm 71 carries a rod 72 that is removably receivable in a sleeve 73 fashioned in the end of the sliding door 68. When the door 68 is in closed position, the arm 69 will be abutting the stop 74. To open the door 68, the operator swings the arm 69 to the right. The opening of the door 68 is done after the cover 65 is secured in place. This prevents light rays from reaching the sensitized strip 41. The same procedure is gone through in opening and closing the door 68 in the container 64.

The other arm 70 on top of the covers 65 and 66 is for the purpose of determining how much of the strip is wrapped around the spools 42 and 47. The arm 70 is secured to a rod 75 and projects through an opening 76 in the covers 65 and 66. The rod 75 is carried by the containers 63 and 64, and an arm 77 (see Figure 3) is secured to the rod. A manual movement of the arm 70 toward the empty position on top of the cover 65 will cause the arm 77 to contact with the roll of strip, and when the arm 77 so contacts it will prevent further movement of the arm 70. In this way the operator can determine how much strip is wrapped on the spools.

I will now describe the means for photostating predetermined characters such as numbers on the tickets. In Figure 11 I show a full sized ticket 78. This ticket shows a photograph of the pointer 13, and this photograph is indicated at 79 on the ticket. The negative chart 6 throws numbers 80 on the ticket and also a weight scale 81. The position of the mark 79 with respect to the scale 81 indicates the weight of the article. In the lower right-hand corner I show a number indicated generally at 82. It is obvious that this number may be disposed on other parts of the ticket if desired. The number may be changed or characters may be substituted for numbers if desired.

In Figure 10 I show a number-carrying frame 83. This frame has an upwardly-extending side 84 that is provided with teeth 85. Thin strips 86 and 87 extend from the side 84, and these strips are bent at right angles so as to extend toward each other. A transparent piece 88 is connected to the strips 86 and 87, and this piece carries numbers 89 from 1 to 9 inclusive and also the number 0.

Figure 4 shows three such frames 83, all of which carry transparent portions 88 with numbers 89 thereon. The transparent portions 88 pass in front of a reduced portion 90 of the window 17 so that the light rays will strike only one member of each portion 88 at a single time.

The frames 83 are slidably mounted in guides 91, and pinions 92 (see Figures 3 and 4) mesh with the racks 85 and are manually turnable for raising or lowering the frames so as to bring the right combination of numbers before the opening 17. Numbered dials 93 are operatively connected to the pinions 92, and these may be manually rotated for bringing the number 357, for example, into registration with the portion 90 of the window 17.

From the foregoing description of the various parts of the device, the operation thereof may be readily understood.

The article is first placed upon the scale (not shown) and the weight of the article will swing the arm 4 for causing the negative chart 6 to indicate the weight. The source of light 8 will throw the correct numbers of the weight upon the glass 14, and a part of the light rays will be reflected onto the glass 12 where they may be read, while the other light rays will pass on through the glass 14 and will strike the compound shutter 18 and 19.

The operator now adjusts the dials 93 for causing the desired number, as, for example, the number 357 shown in Figure 11, to be printed on the ticket.

Then the operator presses the starting button 94, which is located at the upper left-hand corner of the device as shown in Figure 4. This closes a temporary circuit to the solenoid 27, which causes the rod 26 to move to the left. Figure 4 shows a bell crank lever 95 held in the position shown by a pin 96 carried by the rod 26. The initial movement of the rod 26 to the left will free the lever 95 and it will move in a counter-clockwise direction due to its own weight. This movement causes a terminal 97 carried by the lever to electrically connect wires 98 and 99 together, these wires closing a locked circuit to the solenoid 27 and keeping it energized even when the push button 94 is released.

The movement of the lever 95 in a counter-clockwise direction will also move an arm 100 (see Figure 4) in a clockwise direction, and Figure 2 shows this arm as rocking a shaft 101 and as moving a brake arm 102 into frictional contact with the arcuate edge 103 of the arm 4. This frictional contact is sufficient to prevent the chart 6 from fluctuating during the taking of the picture.

I have already described how the movement of the rod 26 to the left will actuate the compound shutter 18 and 19, and how the pawl 50 (see Figure 5) will engage with the next pin 52 on the gear 53. In Figure 4 I show a pin 104 carried by the rod 26, and this pin will engage a projection 105 on a mercury switch 106 to cut out the current to the solenoid 27 and the wires 98 and 99 when the rod 26 moves to the left the required distance and for automatically connecting the current with the solenoid 28. This will cause the rod 26 to move to the right, and the rod during this movement will rotate the gear 53 through one-fourth of a revolution, this gear in turn moving a new portion of the photostat paper 41 in front of the window 54 and winding up a portion of the paper on the spool 47.

When the rod 27 nears the end of its stroke to the right, the pin 96 will first raise the lever 95 for breaking the connection between the wires 98 and 99. At approximately the same time the pin 104 will strike an arm 107, which will rock the mercury switch 106 into the position shown in Figure 4, which will deenergize the solenoid 28 and connect the solenoid 27 in the circuit controlled by the push button 94 and the contact 97. The device is now ready for the next operation.

When a complete reel has been filled, it may be removed and developed for providing a permanent record of the weighings.

In Figures 4 and 5 I show an adjustable friction clamp 108 for varying the friction on the rod 26. In this way the speed of the rod may be varied at will so as to control the time of exposure. A turn knob 109 adjusts the clamp 108.

Although I have shown and described one embodiment of my invention, it is to be understood that the same is susceptible of various changes, and I reserve the right to employ such changes as may come within the scope of the invention as claimed.

I claim:

1. In a device of the type described, a casing having an opening for permitting light rays to pass therethrough, a shutter for the opening, a sensitive material registering with the opening, a plurality of frames, transparent portions carried by the frames and having characters thereon, means for moving the frames for causing different combinations of characters to be positioned adjacent to the opening, whereby said characters will be protographed on the sensitive material when the shutter is opened.

2. In combination, a frame having a relatively narrow slot therein, a transparent scale mounted in the slot and having weight indicia thereon, said scale being movable in accordance with the weight of an article, a pointer fixed relative to the scale, means for illuminating the portion of the scale adjacent to the pointer, and a sensitive strip movable into the path of the rays emanating from the illuminated scale for photographing the latter.

3. In a recording device, a casing having an opening therein, a sensitive strip registering with the opening, transparent members having characters thereon, means for moving the members over the printing surface of the strip in different combinations, and means for directing light through the opening for photographing the selected combination of characters on the strip.

4. In a recording device, a sensitive strip, transparent members having characters thereon mounted over the printing surface of the strip, means for moving the members in different combinations, and means for directing light through the transparent members for photographing a selected combination of characters on the strip.

5. In a recording device, a casing, a sensitive strip mounted therein, transparent members having characters thereon arranged over the printing surface of the strip, numbered dials disposed exteriorly of the casing, means interconnecting a dial with each of the members for moving the latter into different combinations, and means for directing light through the members for photographing the selected combination of characters on the strip.

6. In a recording device, a casing having as opening therein, a sensitive strip registering with the opening, transparent members having characters thereon arranged over the printing surface of the strip, guides allowing the independent movement of the members for producing different combinations of characters in a set-up, means disposed exteriorly of the casing and interconnected with the members for selectively adjusting the members, and means for directing light through the opening for photographing the selected combination of characters on the strip.

CHARLES P. HINMAN.